United States Patent
Ancuta et al.

(10) Patent No.: US 10,036,322 B2
(45) Date of Patent: Jul. 31, 2018

(54) ELECTROFORMED NICKEL-CHROMIUM ALLOY

(71) Applicant: SNECMA, Paris (FR)

(72) Inventors: Carmen Ancuta, Paris (FR); Bruno Albert Beutin, Evry (FR)

(73) Assignee: SNECMA, Paris (FR)

( * ) Notice: Subject to any disclaimer, the term of this patent is extended or adjusted under 35 U.S.C. 154(b) by 302 days.

(21) Appl. No.: 15/103,177

(22) PCT Filed: Dec. 11, 2014

(86) PCT No.: PCT/FR2014/053283
§ 371 (c)(1),
(2) Date: Jun. 9, 2016

(87) PCT Pub. No.: WO2015/087006
PCT Pub. Date: Jun. 18, 2015

(65) Prior Publication Data
US 2016/0376990 A1 Dec. 29, 2016

(30) Foreign Application Priority Data
Dec. 12, 2013 (FR) ..................... 13 62451

(51) Int. Cl.
*F02C 6/00* (2006.01)
*F02C 7/14* (2006.01)
*F02C 7/32* (2006.01)
*F02C 7/36* (2006.01)

(52) U.S. Cl.
CPC ............ *F02C 7/14* (2013.01); *F02C 7/32* (2013.01); *F02C 7/36* (2013.01); *F05D 2250/38* (2013.01); *F05D 2260/213* (2013.01); *F05D 2260/4031* (2013.01); *Y02T 50/675* (2013.01)

(58) Field of Classification Search
CPC ...... F02C 7/14; F02C 7/32; F02C 7/36; F05D 2250/38; F05D 2260/213; F05D 2260/4031; Y02T 50/675
See application file for complete search history.

(56) References Cited

U.S. PATENT DOCUMENTS

| | | | |
|---|---|---|---|
| 6,212,974 B1 | 4/2001 | Van Duyn | |
| 7,631,485 B2 | 12/2009 | Suciu et al. | |
| 8,490,410 B2 | 7/2013 | Suciu et al. | |
| 8,602,717 B2 * | 12/2013 | Suciu | F02C 7/14 415/1 |
| 9,194,294 B2 * | 11/2015 | Suciu | F02C 7/06 |
| 9,416,734 B2 * | 8/2016 | Thies | F02C 7/32 |
| 2009/0175716 A1 | 7/2009 | Vetters | |
| 2009/0290976 A1 * | 11/2009 | Suciu | F01D 25/18 415/122.1 |
| 2013/0239584 A1 | 9/2013 | Suciu et al. | |

(Continued)

OTHER PUBLICATIONS

International Search Report with English Language Translation, dated Apr. 7, 2015, application No. PCT/FR2014/053283.

*Primary Examiner* — Jesse Bogue
(74) *Attorney, Agent, or Firm* — Womble Bond Dickinson (US) LLP (57) ABSTRACT

Aircraft turbomachine comprising at least one heat exchanger (40) and a gearbox (10) in a V-shaped overall configuration and comprising two lateral arms (20) joined together by a central joining piece, the heat exchanger being mounted between the arms of the gearbox.

12 Claims, 6 Drawing Sheets

(56) References Cited

U.S. PATENT DOCUMENTS

2015/0367946 A1* 12/2015 Boileau .................. B64D 29/08
                                                    244/54
2016/0032755 A1*  2/2016 Beutin ..................... F02C 7/32
                                                    415/122.1

* cited by examiner

ELECTROFORMED NICKEL-CHROMIUM ALLOY

TECHNICAL FIELD

The present invention relates to an aircraft turbine engine comprising a heat exchanger and a generally V-shaped gearbox.

PRIOR ART

In application FR 12/58196, the applicant has proposed a gearbox of which the casing is substantially V-shaped and comprises two arms which are interconnected by a joining part. The arms enclose gear lines which are located in non-parallel planes and are joined to each other by at least one gear which is located in the part joining the arms.

Constructing the kinematic chain in a plurality of gear lines which are located in non-parallel planes makes it possible to arrange a gearbox having even large dimensions entirely in the proximity of the casing of the turbine engine, without too much space being taken up in the radial direction, the axial direction or in the angular direction, since the box is not rectilinear. In addition, there are a large number of surfaces of the gearbox (which extend in very different directions) to choose from for positioning the equipment to be driven, and this also contributes to limiting the size of the assembly.

The applicant has further proposed, in FR 13/52284, means for fixing this type of gearbox to a turbine engine body.

Furthermore, a turbine engine is equipped with heat exchangers, including at least one air/oil exchanger of the ACOC (air cooled oil cooler) or SACOC (surface air cooled oil cooler) type. This exchanger comprises two circuits, an air and an oil circuit respectively, air taken off in a flow of the turbine engine being intended to circulate in a first circuit to exchange thermal energy with the oil circulating in the second circuit, the oil thus cooled being routed by a pipe as far as one or more pieces of equipment to be lubricated.

The state of the art also comprises documents U.S. Pat. No. 8,490,410, U.S. Pat. No. 6,212,974 and US Patent Publication no. 2013/239584.

The present invention proposes in particular a solution for facilitating the integration of a heat exchanger in a turbine engine which is equipped with a V-shaped gearbox.

SUMMARY OF THE INVENTION

The invention proposes an aircraft turbine engine, comprising at least one heat exchanger and a gearbox for driving equipment, which is generally V-shaped and which has two lateral arms which are interconnected by a middle joining portion, said arms enclosing lines of gears which are located in non-parallel planes and which are joined to one another by at least one gear which is located in said joining portion, characterised in that the heat exchanger is mounted between the arms of the gearbox.

According to the invention, the lateral arms of a V-shaped gearbox define a space therebetween in which a heat exchanger is mounted. This is particularly advantageous because it facilitates the integration of the exchanger in the turbine engine and further makes it possible to use a space which is unused in the prior art. The exchanger can be designed so as to make the best use of the space between the arms of the gearbox.

The heat exchanger is for example an air/oil exchanger, for example of the ACOC or SACOC type. Said exchanger can be a brick or fin tube exchanger. In the case of a brick exchanger, it can comprise an air inlet scoop and at least one air outlet nozzle, which are mounted between the arms of the gearbox. The inlet scoop is intended to take off air from a flow of air flowing in the turbine engine, and in particular a secondary air flow in the case of a bypass turbojet engine. In the case of a fin tube exchanger, the fins are swept by a flow of air from the turbine engine, such as a secondary airflow, and exchange thermal energy with oil circulating in an oil circuit of the exchanger. Brick and fin tube exchangers are well known to persons skilled in the art.

The heat exchanger can comprise a fluid output for cooling (cooling oil in the case of an ACOC or SACOC exchanger) of equipment supported by the gearbox. The exchanger thus cools equipment of the gearbox. Since the exchanger is located close to the equipment supported by the gearbox, it is not necessary to provide a long pipe to connect the cooling fluid output of the exchanger to the equipment, and this reduces in particular the mass of the assembly.

The gearbox can be located at six o'clock in terms of the dial of a clock. It is thus located in the lower portion of the turbine engine, and this can make it easier for an operator to access during a maintenance operation.

Advantageously, the exchanger comprises means for fixing to the two arms of the gearbox. The exchanger thus rigidifies the arms of the gearbox. It is thus conceivable to eliminate the transverse reinforcing member from the prior art, which would interconnect the arms in order to rigidify the gearbox and thus limit the deformations thereof, in particular to limit the arms thereof moving closer together or further apart.

The means for fixing the exchanger to the gearbox can comprise damping means.

The gearbox can be fixed to the body of the turbine engine, which is surrounded by an annular wall formed by two substantially semi-cylindrical cowls. Each cowl is preferably mounted so as to be able to slide in axial translation on the body of the turbine engine and is connected by connecting rods to a rail/sliding rail system which is supported by the heat exchanger. The exchanger thus acts as a support for a rail/sliding rail system which can make it easier to open the annular wall and move the cowls thereof, said annular wall being for example the wall referred to as the IFS (inner fan structure) which is used to define the inside of the flow path of the secondary airflow of a bypass turbojet engine.

The rail/sliding rail system can comprise a rail which is rigidly connected to the exchanger and a sliding rail which is movable in translation with respect to the rail, the sliding rail being connected by a first connecting rod to a second connecting rod, one end of which is articulated on the body of the turbine engine, and the other end of which is articulated on a cowl. Preferably, the second connecting rods substantially form a V shape, and one of the ends thereof is fixed to substantially the same point on the sliding rail. The first connecting rods preferably substantially form a V shape, and one of the ends thereof is fixed to substantially the same point on the body of the turbine engine. Each second connecting rod can be connected to one of the first connecting rods, at a point which is remote from the longitudinal ends thereof. As will be explained in detail in the following, this rail/sliding rail and connecting rod system can operate in the manner of an umbrella.

Advantageously, the turbine engine comprises a first heat exchanger of the surface type and a second heat exchanger of the volume or brick type, said first heat exchanger being mounted between the arms of the gearbox, and said second heat exchanger being rigidly connected to said first exchanger and mounted under said first heat exchanger. Said second exchanger can comprise a scoop having a movable flap, which is preferably controlled.

DESCRIPTION OF THE DRAWINGS

The invention will be better understood and other details, features and advantages of the invention will become more apparent upon reading the following description given by way of non-limiting example and with reference to the accompanying drawings, in which.

DETAILED DESCRIPTION

In the following description, the terms "upstream" and "downstream" refer to the direction of flow of gases in a turbine engine.

Figure 1:
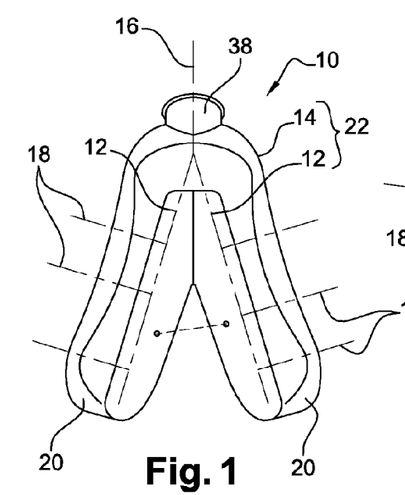
FIG. 1 is a schematic perspective plan view of a V-shaped gearbox of a turbine engine.
Figure 2:
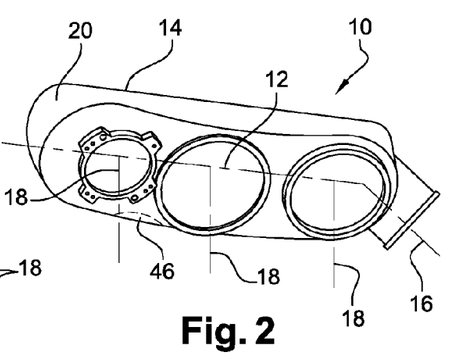
FIG. 2 is a schematic perspective side view of the gearbox from FIG. 1.

Reference is first made to FIGS. 1 and 2, which show a gearbox 10 for driving equipment (not shown) of a turbine engine, such as a turbojet engine or a turboprop engine of an aeroplane. Said gearbox 10 is intended to transmit a mechanical power originating from the turbine engine by means of a radial shaft emerging from said engine, and to transmit it to the equipment, which are pumps, electricity generators, etc. The transmission is carried out by means of a kinematic chain composed of successive gears, said chain being composed of lines of gears 12 which are located in non-parallel planes and shown schematically by dotted lines in FIG. 1. A line of gears 12 is an assembly of adjacent gears, meshing in principle therebetween, the toothed wheels of which are located in the same plane or in parallel planes; in other words, the axes of rotation of the toothed wheels are all parallel (perpendicular to this plane or to these parallel planes), and the toothed wheels meshing directly therebetween are considered to extend in the same plane; the line of gears can however continue in parallel planes if there are toothed wheels which are aligned along the same axis of rotation or offsets of teeth within the same gear.

The gearbox 10 substantially comprises a kinematic chain which is made up of the set of toothed wheels, which mesh with one another so as to transmit a movement, within a casing 14. This chain is connected to a drive shaft 16 which is the radial shaft of the turbine engine or an intermediate shaft, the chain also being connected to take-off shafts 18 for the movement of the equipment. The gearbox 10 is attached to the turbine engine and the equipment itself is attached to the gearbox 10.

The casing 14 of the gearbox 10 is substantially V-shaped and comprises two arms 20 which are interconnected at one of the ends thereof by a joining part 22. In the example shown, the joining part 22 extends over substantially half the length of the arms 20. Each arm 20 comprises at least one side face for mounting the equipment.

Figure 3:
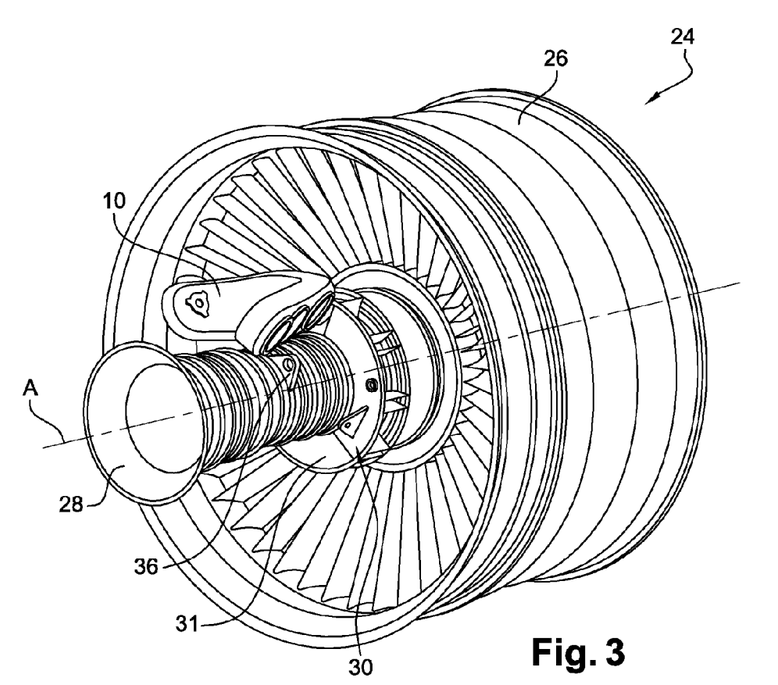
FIG. 3 is a schematic perspective side view, viewed from downstream, of a turbine engine equipped with the gearbox from FIG. 1.

As can be seen in FIG. 3, the gearbox 10 is mounted on the body of the turbine engine 24, which in this case is a bypass turbojet engine. Conventionally, this turbine engine 24 comprises, from upstream to downstream, a fan 26 that generates a flow that divides into two coaxial flows, the primary flow supplying the engine, which comprises a low-pressure compressor, a high-pressure compressor, a combustion chamber, a high-pressure turbine, a low-pressure turbine and an exhaust nozzle 28 for ejecting the combustion gases. The turbine engine 24 further comprises, between the low-pressure compressor and high-pressure compressor, a structural intermediate casing 30 which typically comprises an intermediate hub 31 surrounded by two respectively inner and outer coaxial cylindrical walls, which define the passage duct for the secondary flow and are interconnected by radial tubular arms which are used in general for the passage of sub-systems.

In the example shown, the gearbox 10 is mounted downstream of the fan 26 in the space located between the casing 36 of the high-pressure compressor and the above-mentioned inner cylindrical wall of the intermediate casing 30. The gearbox 10 is positioned such that the joining part 22 thereof is oriented towards the upstream end and such that the arms 20 thereof extend towards the downstream end and are located symmetrically on both sides of a plane passing through the longitudinal axis A of the turbine engine. It will be appreciated that the gearbox 10 could be mounted in another manner in the turbine engine, and in particular have a different orientation. For example, for certain turbine-engine or turboprop-engine architectures, depending on the casings, the gearbox may be positioned such that the arms thereof extend towards the upstream end.

FIGS. 1 to 3 show the prior art as described in patent application FR 13/52284.

FIGS. 4 to 11 show one embodiment of the invention.

Figure 4:
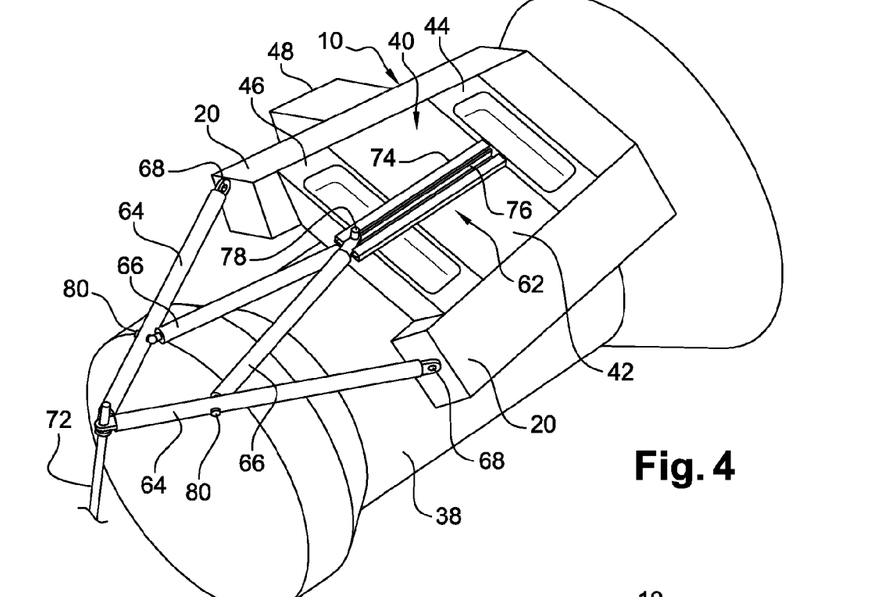
FIGS. 4 and 5 are schematic perspective views of a turbine engine which is equipped with a V-shaped gearbox and a heat exchanger which supports a rail/sliding rail system, said system being shown in two positions, a closing and an opening position respectively, of an annular wall (not shown)
Figure 5:
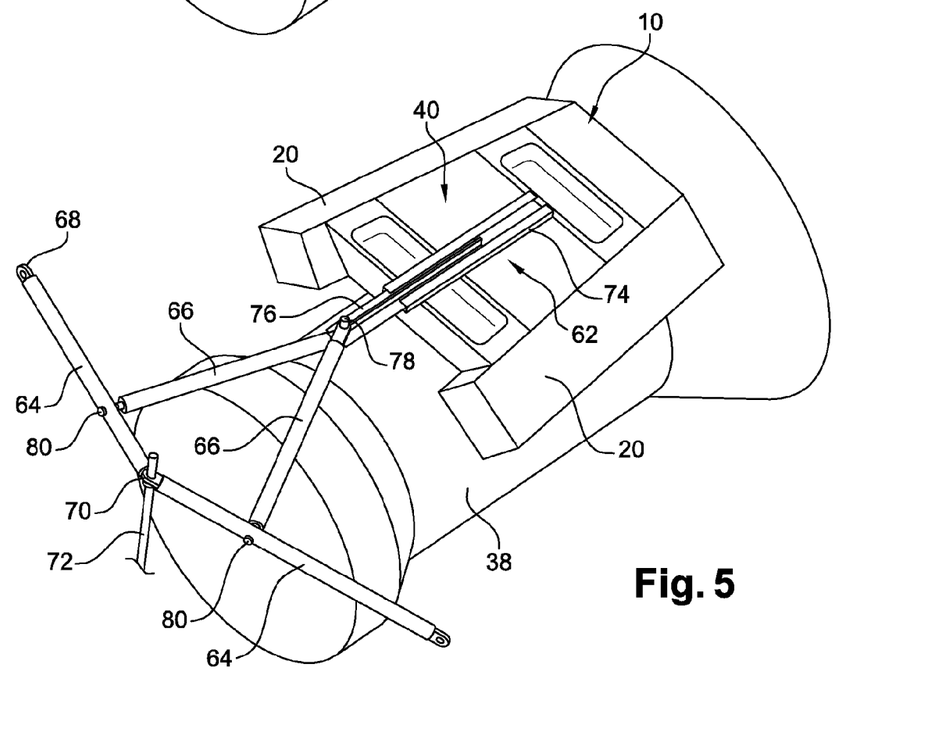

According to the invention, a heat exchanger 40 is mounted between the arms 20 of the gearbox 10 (FIGS. 4 and 5).

The exchanger 40 shown in FIGS. 4 and 5 is an air/oil exchanger (ACOC) of the brick exchanger type, and comprises a heat exchange block 42 defining two circuits, an air and an oil circuit respectively, a scoop 44 for taking off air from the secondary flow and supplying the air circuit of the block 42, and at least one exhaust nozzle 46 for evacuating the air leaving said air circuit. The oil circuit of the block 42 is supplied with oil by suitable means (not shown) and comprises an output (not shown) which is connected by a pipe or the like to a piece of equipment 48 such as a generator which is mounted on one of the faces of an arm 20 of the gearbox 10.

In the example shown, the exchanger 40 occupies virtually all of the space between the arms of the gearbox 10 and is fixed directly to the arms 20 by suitable means.

The gearbox 10 and the exchanger 40 are mounted in the vicinity of the body 38 of the turbine engine, which is surrounded by two annular walls delimiting the flow path of the secondary airflow, as described above. The radially inner wall, referred to as the IFS, is not shown in FIGS. 4 and 5, but is shown in FIGS. 6 to 11 and 14 (under the reference number 50).

The inlet scoop 44 of the exchanger 40 communicates with an opening in said wall 50 in order to allow the take-off of air from the secondary airflow, and the exhaust nozzle 46 communicates with another opening in said wall in order to evacuate the hot air leaving the exchange block 42 in the secondary airflow.

The exhaust nozzle 46 for evacuating the air can have a reinforced structure so as to rigidly connect the two arms 20 in the vicinity of the free ends thereof, i.e. opposite the joining portion 22, to form a reinforcing member which takes up the forces between the two arms. This makes it possible to prevent a beating action between the arms which would lead to premature wear of the casing 14 of the gearbox 10. Alternatively or in addition to this result, a connecting rod for taking up forces, which is for example articulated at the ends thereof to each arm 20, can rigidly connect the two arms 20 in the vicinity of the free ends thereof.

As can be seen in FIGS. 6 to 11, the wall 50 is substantially cylindrical and is formed of two semi-cylindrical cowls 52 which are mounted around the body 38 on both sides of a longitudinal vertical plane of the turbine engine.

Figure 6:
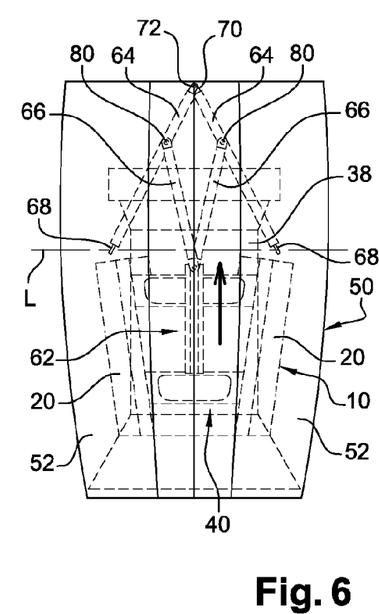
FIGS. 6 and 7 are schematic views from below and from the front of the turbine engine from FIGS. 4 and 5, in which the wall is in the closed or operating position.
Figure 7:
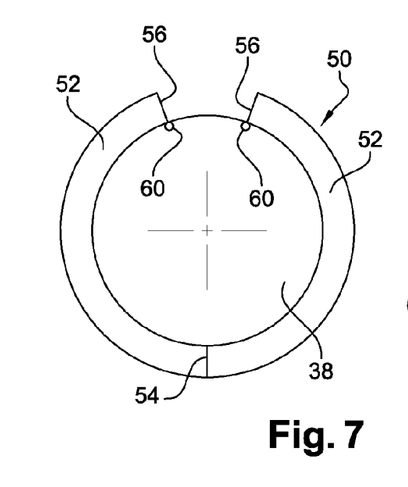

In the operating or closing position shown in FIGS. 6 and 7, the wall 50 is closed, and the cowls 52 are moved closer to the body 38 of the turbine engine. In this position, the lower longitudinal edges 54 of the cowls 52 are in the vicinity of one another, the upper longitudinal edges 56 being able to be at a distance from one another, as can be seen in FIG. 7, in order to define for example a circumferential space for mounting the suspension strut of the turbine engine on the aircraft.

The turbine engine comprises means for moving each cowl 52 from the operating position thereof into a maintenance position (shown in FIGS. 10 and 11), in which the cowl is firstly moved radially away from the body 38 of the turbine engine and secondly retracted downstream with respect to the operating position thereof.

In the example shown, the moving means comprise rail/sliding rail systems 60, 62 and connecting rods 64, 66.

Rail/sliding rail systems 60 are mounted between the upper longitudinal edges 54 of the cowls and the body 38 of the turbine engine, and each comprise a guide rail which is mounted on the body 38 of the turbine engine and a sliding rail which is adapted to slide along the guide rail. Alternatively, the guide rail of each system 60 can be supported directly by the strut. As shown schematically in the drawings, the system 60 extends substantially in parallel with the longitudinal axis of the turbine engine.

Each cowl 52 is further connected to the body 38 of the turbine engine by a connecting rod 64, one end 68 of which is articulated on a fixing means (such as a yoke) which is rigidly connected to the radially inner surface of the cowl 52, and the opposite end 70 of which is articulated on a fixing means which is rigidly connected to the body 38 of the turbine engine. The ends 68, 70 of the connecting rods 64 can be articulated by ball-joint or pivot connections.

It is noted in FIG. 6 that, in the operating position, the ends 68 of the connecting rods 64 extend in a transverse plane L which is set back (downstream) from the transverse plane passing through the (downstream) free ends of the arms 20 of the gearbox 10 so that there is no risk of contact between the connecting rods 64 and the gearbox 10.

As can be seen in FIGS. 4 to 6 in particular, the connecting rods 64 are articulated at substantially the same point on the body 38 of the turbine engine, which can then comprise a single means 72 for fixing said connecting rods 64.

Said connecting rods 64 form a V shape, the point of which is oriented downstream. The movement of the cowls 52 from the operating position thereof into the maintenance position thereof leads to an enlargement of the angle formed by the connecting rods. The angular movement of each cowl 52 around the longitudinal axis of the corresponding system 60 in this case is approximately 30°.

According to the invention, the moving means further comprise a rail/sliding rail system 62 which is supported by the heat exchanger 40 and is connected by connecting rods 66 to the above-mentioned connecting rods 64.

The system 62 comprises a guide rail 74 which is fixed to the exchange block 42 and a sliding rail 76 which is adapted to slide along the guide rail 74. The rail 74 and the sliding rail 76 in this case are substantially in parallel with the longitudinal axis of the turbine engine and extend in the above-mentioned longitudinal vertical plane (FIG. 8).

Figure 8:
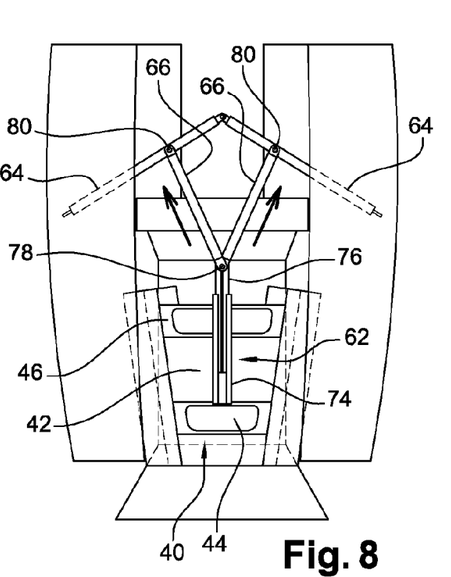
FIGS. 8 and 9 are schematic views from below and from the front of the turbine engine from FIGS. 4 and 5, in which the wall is in the open and advanced position.
Figure 9:
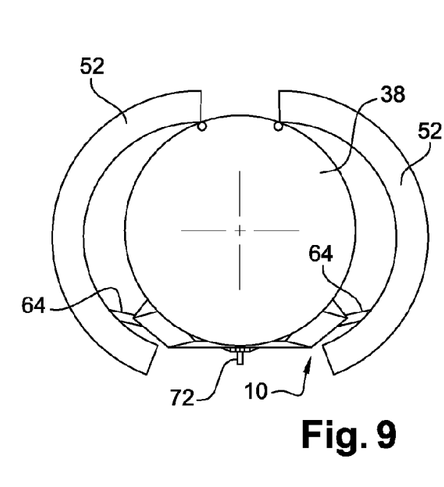
Figure 10:
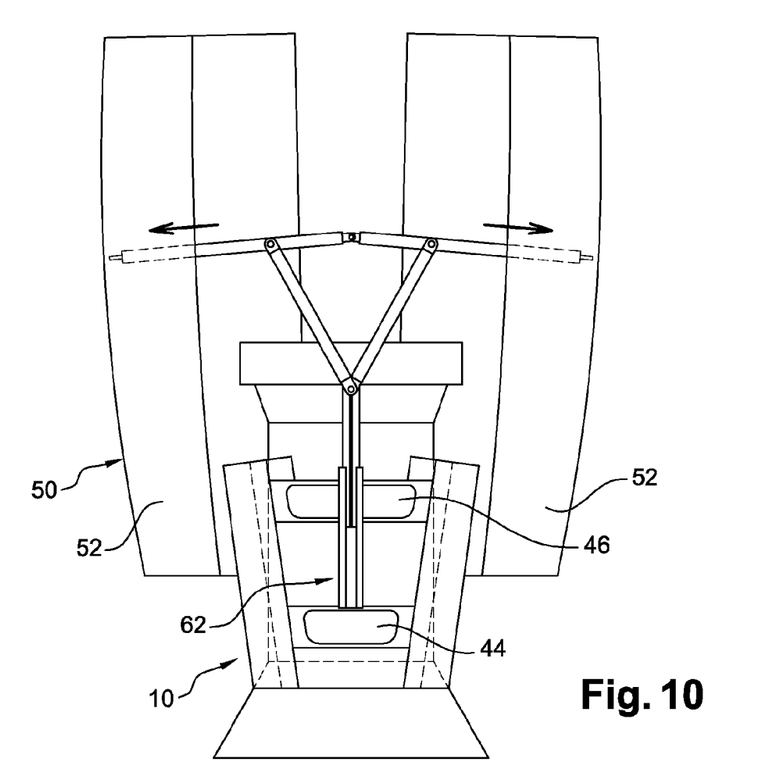
FIGS. 10 and 11 are schematic views from below and from the front of the turbine engine from FIGS. 4 and 5, in which the wall is in the open and retracted position, which is also referred to as the maintenance position.
Figure 11:
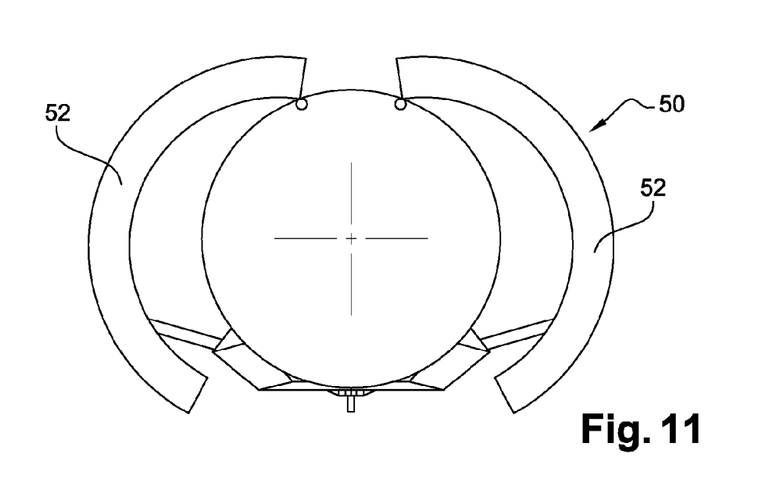
Figure 12:
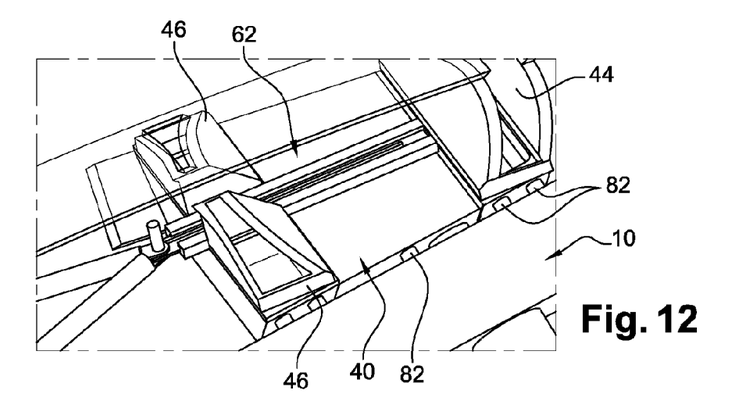
FIGS. 12 and 13 are schematic perspective views of a heat exchanger of the ACOC type.
Figure 13:
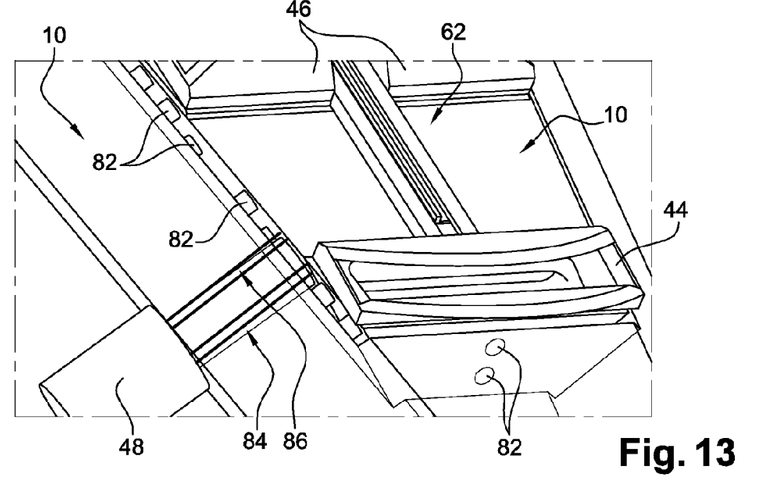

The rail 74 has the upstream end thereof which is downstream of the scoop 44 so as not to disrupt the take-off of air from the secondary airflow (FIGS. 4, 5 and 8). The rail 74 is extended downstream beyond the exchanger 40 and extends above the exhaust nozzle 46, which can comprise two independent outputs which are located on either side of the system 62, in order to prevent said rail from passing through the flow of air leaving the exhaust nozzle 46. This alternative embodiment is shown in FIGS. 12 and 13. The sliding rail 76 has a length which is equivalent to that of the rail 74. The downstream end thereof comprises means 78 for articulating (by means of a ball joint or pivot) the upstream ends of the two connecting rods 66. These ends are thus fixed to the same point on the sliding rail 76.

The connecting rods 66 form a V shape, the point of which is oriented upstream and is thus opposite that of the other connecting rods 64. The downstream ends of the connecting rods 66, which are opposite the system 62, are articulated on the connecting rods 64 in such a way that the movement of the connecting rods 66 away from one another (i.e. the enlargement of the angle that they define therebetween) causes the movement of the connecting rods 64 away from one another, and the opening of the wall 50, i.e. the movement of the cowls 52 away from the body 38 of the turbine engine. The connecting rods 64, 66 thus operate in the manner of an umbrella, the connecting rods 66 providing the function of the spokes of the umbrella and leading the connecting rods to move away from, or closer to, one another when the spokes themselves are moved away from, or closer to, one another.

The point 80 of articulation of each connecting rod 66 on a connecting rod 64 is located at a distance from the ends of the connecting rod 64. In the example shown, this point is located approximately ⅓ of the way down the length of the connecting rod 64, measured from the downstream end 70 of the connecting rod 64.

The system 62 and the connecting rods 64, 66 extend substantially in the same plane and are thus coplanar. Said plane is substantially symmetrical with respect to the above-mentioned longitudinal vertical plane.

The movement of the cowls 52 from the operating positions thereof into the maintenance positions thereof can be carried out as follows.

The cowls 52 are moved from upstream to downstream, along the guide rails which are rigidly connected to the body 38 of the turbine engine and the exchanger 40. The cowls 52 then move out of the operating positions thereof shown in FIGS. 6 and 7 into the maintenance positions thereof shown in FIGS. 8 and 9, in which they are moved away from the body 38 and retracted downstream.

This movement is made possible by means of the systems 60, and in particular the sliding rails which are rigidly connected to the cowls 52 and which cooperate with the rails which are rigidly connected to the body 42, and secondly by the connecting rods 64. The system 62 and the connecting rods 66 make it possible to guide this movement and ensure that the cowls are in the same position with respect to the body of the turbine engine.

The movement of the cowls 52 from the operating positions thereof as far as the maintenance positions thereof can be carried out manually or can be automated, for example using electric, mechanical, hydraulic or pneumatic actuation means which actuate actuators. There can be just one actuation means which acts directly on the sliding rail 76 of the system 62 for example.

In the above-mentioned alternative embodiment in FIGS. 12 and 13, the exhaust nozzle 46 comprises two adjacent half parts which are separated from one another by the rail/sliding rail system 62. Furthermore, the reference number 82 denotes damping segments which connect the exchanger 40 to the gearbox 10 in order to limit the transmission of vibrations between these elements. In addition, as explained above, the equipment 48 (FIG. 13) supported by the gearbox 10 is cooled by oil leaving the exchanger 40, which is routed from the exchanger as far as the equipment by a first pipe 84, then evacuated from the equipment and sent back to the exchanger by a second pipe 86. In this case, the equipment 48 is an AC current generator (variable frequency generator).

Figure 14:
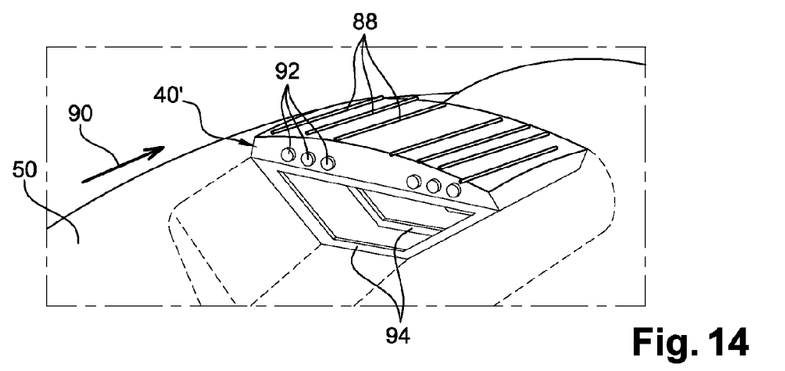
FIG. 14 is a schematic perspective view of a heat exchanger of the SACOC type.

FIG. 14 shows an alternative embodiment of the invention in which the heat exchanger 40' is of the fin tube (SACOC) type and comprises fins 88 which are intended to be swept by the secondary airflow 90 and to exchange thermal energy with the oil of an oil circuit 92 of the exchanger. Said exchanger 40' thus does not comprise a scoop or an exhaust nozzle and is mounted between the arms of a gearbox, as explained above, for example by means of supports 94 which are designed to adapt to the space between the arms and to be fixed to said arms by suitable means. The surface of the exchanger 40' comprising the fins 88 is in the extension of the wall 50 (IFS), said wall being modified to include the exchanger 40'. A portion of said wall 50 can remain stationary during the opening of the cowls to facilitate this opening.

At least one support 94 which is designed to adapt to the space between the arms can have a reinforced structure so as to rigidly connect the two arms and thus prevent a beating action between the arms. Furthermore, it is possible to provide a hybrid heat exchanger which is produced from the surface-type heat exchanger 40' by adding to said device a volume-type heat exchanger, i.e. of the brick exchanger type such as an exchanger 40 described previously, so as to increase the cooling capacity.

The free space which can be seen in FIG. 14 between the supports 94 and the surface exchanger 40' can be used to accommodate at least a portion of the heat exchange block of the volume exchanger therein. Said block can be used as a support for the surface exchanger, and can thus replace the supports 94. A scoop for taking off air from the secondary airflow and supplying the air circuit of said block is provided adjacent to the surface exchanger, upstream of said exchanger with respect to the direction of flow of the air, and at least one exhaust nozzle for evacuating the air is provided downstream. The take-off scoop can be flush with the flow of air from the secondary airflow and can extend the surface of the surface exchanger upstream.

Figure 15A:
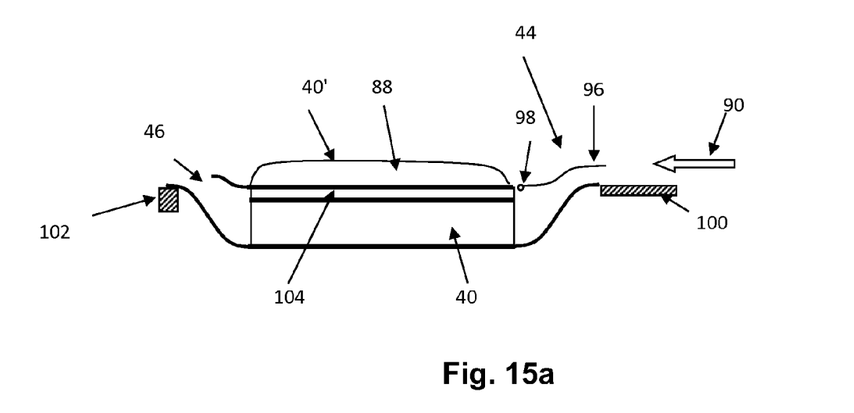
FIG. 15A is an alternate embodiment of the heat exchanger in which the take-off scoop can intercept the flow of the air.
Figure 15B:
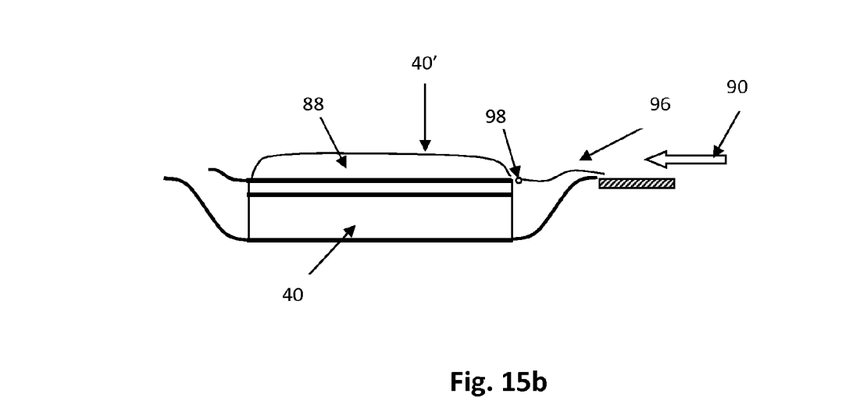
FIG. 15B is an alternate embodiment of heat exchanger equipped with a controlled flap.

In an alternative embodiment, the take-off scoop can intercept the flow of the air (referred to as a dynamic scoop) and can be arranged so as not to prevent the air of the secondary airflow from passing over the surface of the surface exchanger. In one embodiment, said dynamic scoop can be equipped with a controlled flap, so as to vary the rate of flow of air taken off and thus the cooling capacity according to the cooling requirements (cf. FIGS. 15*a* and 15*b*).

The flap 96 can have a longitudinal section which is slightly curved in the shape of an S, in order to improve the aerodynamics in the open position of the scoop 44, by comparison with a planar flap which would risk generating turbulence in particular in the region of the leading edge thereof.

The end bearings of the shaft 98 of the flap 96 can each be accommodated in the casing of a lateral arm 20 so as to be lubricated by the lubrication oil of the gears in the arms 20. The control mechanism of the shaft 98 can also be provided so as to be accommodated in the casing of a lateral arm 20, but an external mechanism of the casing is still possible.

The reference numbers 100 and 102 denote the outer wall of the gearbox 10 and a connection rigidly connecting the two arms 20 respectively.

The oil circuits of the two surface 40' and volume 40 exchangers can be connected in series or in parallel.

Furthermore, this solution is still compatible with a rail/sliding rail system supported by the heat exchanger, such as the system 62 which is described with reference to FIGS. 4 to 8. This system can be fixed to the plate 104 of the surface exchanger 40', in a median fixing region which separates two lateral regions from the plate, each lateral region comprising fins.

The invention claimed is:

1. An aircraft turbine engine, comprising at least one heat exchanger and a gearbox for driving equipment, which is generally V-shaped and which has two lateral arms which are interconnected by a middle joining portion, said arms enclosing lines of gears which are located in non-parallel planes and which are joined to one another by at least one gear which is located in said joining portion, wherein the heat exchanger is mounted between the arms of the gearbox.

2. The turbine engine according to claim 1, wherein the heat exchanger is an air/oil exchanger.

3. The turbine engine according to claim 1, wherein the heat exchanger comprises a fluid output for cooling equipment which is supported by the gearbox.

4. The turbine engine according to claim 1, wherein the gearbox is located in a lower portion of the turbine engine.

5. The turbine engine according to claim 1, wherein the exchanger comprises means for fixing to the two arms of the gearbox.

6. The turbine engine according to claim 5, wherein the fixing means comprise damping means.

7. The turbine engine according to claim 1, wherein the gearbox is fixed to a body of the turbine engine which is surrounded by an annular wall which is formed by two substantially semi-cylindrical cowls, each cowl being connected by connecting rods to a rail/sliding rail system which is supported by the exchanger.

8. The turbine engine according to claim 7, wherein the rail/sliding rail system comprises a rail which is rigidly connected to the exchanger and a sliding rail which is movable in translation with respect to the rail, the sliding rail being connected by a first connecting rod to a second connecting rod, one end of which is articulated on the body, and the opposite end of which is articulated on a cowl.

9. The turbine engine according to claim 8, wherein the first connecting rods substantially form a V shape, and one of the ends thereof is fixed to substantially the same point on the sliding rail.

10. The turbine engine according to claim 8, wherein the two connecting rods substantially form a V shape and one of the ends thereof is fixed to substantially the same point on the body of the turbine engine, each second connecting rod being connected to one of the first connecting rods at a point which is remote from the longitudinal ends thereof.

11. The turbine engine according to claim 1, wherein the at least one heat exchanger comprises a first heat exchanger of the surface type and a second heat exchanger of the volume or brick type, the first heat exchanger being mounted between the arms of the gearbox, and the second heat exchanger being rigidly connected to the first exchanger and mounted under the first heat exchanger.

12. The turbine engine according to claim 11, wherein said second exchanger comprises a scoop having a movable flap.

* * * * *